United States Patent [19]

Doerge

[11] 4,423,163
[45] Dec. 27, 1983

[54] METHOD OF PRODUCING PHENOLIC FOAM USING PRESSURE AND FOAM PRODUCED BY THE METHOD

[75] Inventor: Herman P. Doerge, Oakmont, Pa.

[73] Assignee: Koppers Company, Inc., Pittsburgh, Pa.

[21] Appl. No.: 195,457

[22] Filed: Oct. 9, 1980

[51] Int. Cl.³ ............................................ B29D 27/04
[52] U.S. Cl. .................................. 521/181; 264/45.5; 264/53; 264/DIG. 2; 521/117
[58] Field of Search .................. 264/DIG. 2, 45.5, 53; 521/181, 117

[56] References Cited

U.S. PATENT DOCUMENTS

| | | | |
|---|---|---|---|
| 2,653,139 | 9/1953 | Sterling | 264/DIG. 2 |
| 2,979,469 | 4/1961 | Shannon et al. | 264/DIG. 2 |
| 3,182,104 | 5/1965 | Cwik | 264/45.5 X |
| 3,298,973 | 1/1967 | Quarles et al. | |
| 3,726,708 | 4/1973 | Weissenfels et al. | |
| 3,821,337 | 6/1974 | Bunclark et al. | 264/26 |
| 3,835,208 | 9/1974 | Koutitonsky | 264/DIG. 2 |
| 3,867,495 | 2/1975 | Heller | 264/DIG. 2 |
| 3,885,010 | 5/1975 | Bruning et al. | 264/46.2 |
| 4,035,456 | 7/1977 | Hubbard et al. | 264/DIG. 2 |
| 4,107,107 | 8/1978 | Mendelsohn et al. | 264/DIG. 2 |
| 4,176,216 | 11/1979 | Reid et al. | 521/181 X |
| 4,243,761 | 1/1981 | Savey | 264/DIG. 2 |
| 4,252,908 | 2/1981 | Paladini | 521/181 X |
| 4,256,803 | 3/1981 | Savey et al. | 264/DIG. 2 |

FOREIGN PATENT DOCUMENTS 586199 3/1947 United Kingdom ......... 264/DIG. 2

Primary Examiner—Philip E. Anderson
Attorney, Agent, or Firm—Herbert J. Zeh, Jr.

[57] ABSTRACT

The present invention is directed to a method of producing phenolic foams comprising introducing into a substantially closed volume a phenolic resole resin foamable composition and allowing the composition to foam in this volume wherein a pressure in excess of ambient atmospheric pressure is achieved within this volume. This pressure in excess of ambient atmospheric pressure generally is in excess of about 2 pounds per square inch, typically in excess of about 5 pounds per square inch, and preferably in excess of about 6 pounds per square inch, gauge pressure.

The present invention is also directed to foams produced by the method of the invention.

8 Claims, 6 Drawing Figures

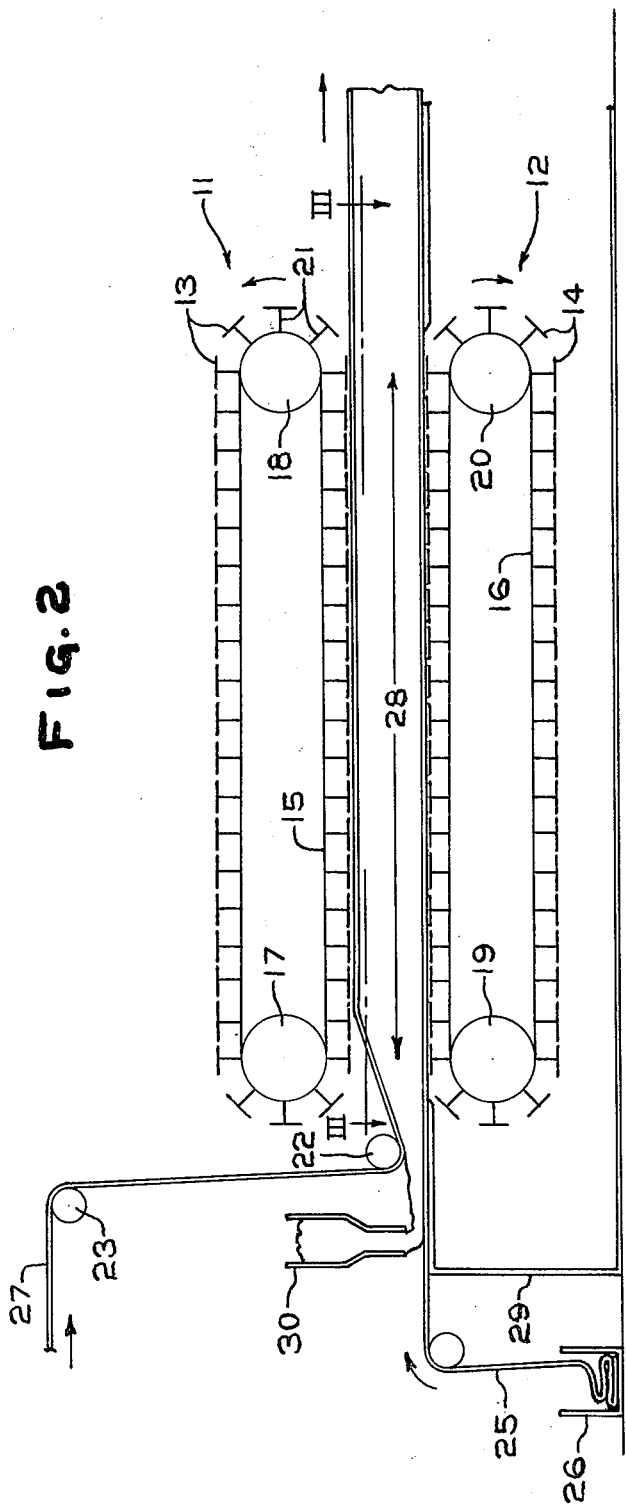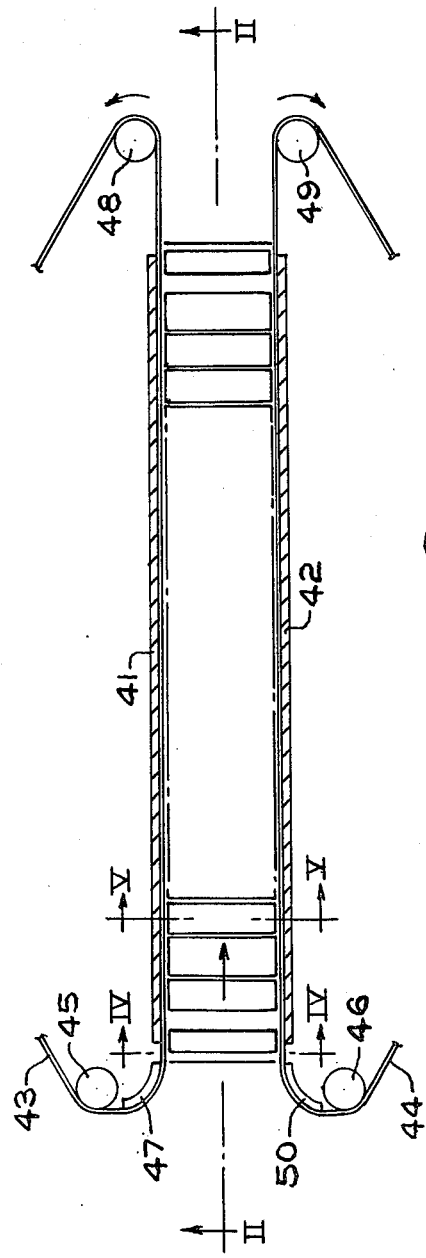

METHOD OF PRODUCING PHENOLIC FOAM USING PRESSURE AND FOAM PRODUCED BY THE METHOD

BACKGROUND OF THE INVENTION

The use of phenolic resins for solid castings, solid moldings and coating films is well known in the coatings and resins industry. Additionally free rise foams made from phenolic resole resins are known. Although the use of phenolic foams would appear to be attractive for potential use in thermal insulation applications, such use has been severely limited by the generally inferior insulating properties of known phenolic foams as compared, for example, to polyurethane foams.

The thermal insulating ability of a foamed material generally may be evaluated by thermal conductivity or "K factor." The thermal conductivity or K factor of a particular insulation material is measured according to ASTM Method C-518 Revised, and is expressed dimensionally as (BTU×inch)/(hour×square foot×° F.). The lower the K factor, the better is the insulating quality of the insulation material. Additionally, the longer the material such as a foam insulation can retain a low K factor, the better is the insulating efficiency of the material with time.

Generally known phenolic foams produced from compositions of phenol-formaldehyde resole resins, acid catalysts, surfactants and blowing agents suffer from generally unacceptable initial K factors and their inability to retain a low K factor over an acceptable period of time.

Although the specific reasons for both generally poor initial K factor and increase in K factor with time are largely unknown, they are believed to be at least in part attributable to such factors as the percentage of closed cells in the phenolic foam and the ability of the cell walls to inhibit the outward diffusion from the cells of trapped gases used as blowing agents and the inward diffusion of components of air into the cells.

The present invention is directed to a method for producing phenolic foams having improved properties as will become apparent in the discussion following. The invention also is directed to foams produced using the method of the invention.

SUMMARY OF THE PRESENT INVENTION

The present invention comprises a method of foaming a phenolic resole resin foamable composition in a substantially closed volume wherein a pressure in excess of about 2 pounds per square inch on the outer surface of the foam is attained within this volume.

BRIEF DESCRIPTION OF THE DRAWINGS

Like numerals refer to like parts in the following drawings.

FIG. 2 shows diagrammatically a side view in cross section of a foam forming machine.

FIG. 3 shows diagrammatically a partial sectional view taken along line III—III of FIG. 2.

DETAILED DESCRIPTION OF THE INVENTION

The method of the invention comprises introducing into a substantially closed volume a phenolic resole resin foamable composition and allowing the composition to foam in this volume wherein a pressure in excess of about 2 pounds per square inch is achieved within the volume. This pressure in excess of about 2 pounds per square inch is measured on the surface of the composition which forms the outer surface of the foam; however, it is believed that this pressure is substantially equally distributed throughout the volume of the composition.

Figure 1A:
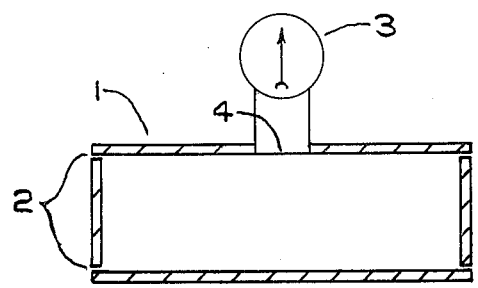
FIGS. 1A and 1B show diagrammatically in partial cross section substantially closed molds.
Figure 1B:
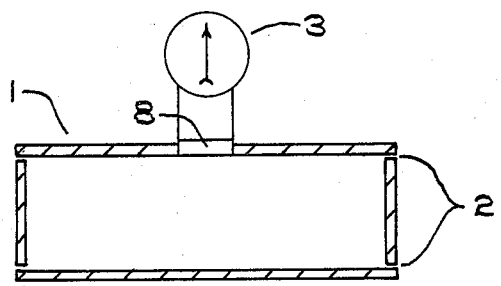

In one embodiment of the invention the phenolic resole resin foamable composition is introduced into a rigid, substantially closed mold as illustrated for example in FIGS. 1A and 1B and allowed to expand initially under essentially ambient atmospheric pressure. The mold (1) generally contains apertures (2) as for example the narrow slits where the sides of the mold are clamped together. As the foamable composition expands to fill the mold, the apertures become sealed by the composition itself as it displaces the air in the mold upon rising. The phenolic foamable composition is formulated such that when the foam has expanded to fill and seal the mold, it will generate a pressure on the walls of the mold in excess of about 2 pounds per square inch. This pressure can be measured for example by a pressure gauge (3) attached to a wall of the mold, the gauge capable of responding to pressure generated in the mold by means for example of a flexible diaphram (4) as illustrated in FIG. 1A or movable piston (8) as illustrated in FIG. 1B in contact with the constrained foam. The pressure generated by the constrained foam within the mold generally is in excess of about 2 pounds per square inch, typically in excess of about 5 pounds per square inch and preferably in excess of about 6 pounds per square inch, gauge pressure.

In another embodiment of the invention employing a continuous processing technique, phenolic resole resin foam is produced under pressure in a machine of the type illustrated schematically in FIG. 2. The foamable composition is applied to a lower facing material (25) such as cardboard containing a thin layer of aluminum, a glass mat, a rigid substrate such as hardboard, or a vinyl skin, which material is caused to exit a container (26) and move along a table (29) by a lower conveyor (12). The foamable composition is applied by means of a distribution device (30) which moves in a back and forth motion transversely to the direction of movement of the lower facing material (25) although any suitable means for evenly distributing the composition such as a multiple mix head may be employed. As the foamable composition is carried downstream, it begins to foam and is contacted by an upper facing material (27) directed by means of rollers (22) and (23) to the region where the foamable composition is in a very early stage of expansion. As the foamable composition begins to expand initially under substantially ambient atmospheric pressure, it is carried into a curing cavity (28) formed by the lower portion of an upper conveyor (11), the upper portion of the lower conveyor (12), and two fixed, rigid side walls called side rails not shown in FIG. 2 but illustrated by (41) and (42) of FIG. 3. The thickness of the foam is determined by the distance of the upper conveyor (11) from the lower conveyor (12). The upper conveyor (11) can be moved by any suitable lifting means (not shown) perpendicularly to the lower conveyor (12) which itself cannot be raised or lowered. When the upper conveyor (11) is raised or lowered, it moves between the fixed rigid side walls (41) and (42) as illustrated in FIG. 3 which walls are immediately adjacent to the sides of the upper conveyor (11). The surfaces of the conveyors which contact the upper and lower facing materials comprise a plurality of pressure plates (13) and (14) fixed to the conveyor by rigid attaching means (21). The pressure plates generally are heated by means of hot air which is introduced into and circulated inside the upper and lower conveyors by means of air ducts not shown in the drawings.

Figure 4:
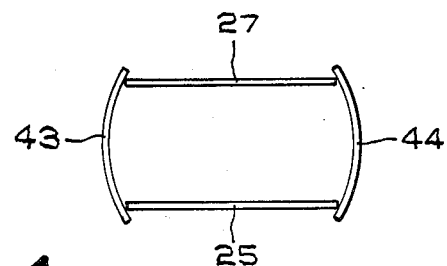
FIG. 4 shows diagramatically a cross sectional view taken along line IV—IV of FIG. 3.
Figure 5:
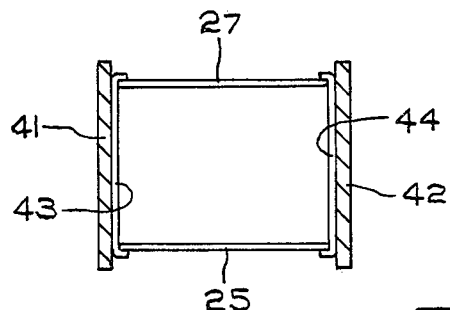
FIG. 5 shows diagramatically a cross sectional view taken along line V—V of FIG. 3.

Simultaneously with the upper and lower facing papers, side papers (43) and (44) as illustrated in FIG. 3 containing a foam releasing material such as a thin film of polyethylene are guided into the curing cavity by rollers (45) and (46) and means such as guide bars (47) and (50). Each of the guide bars is placed just ahead of the curing cavity (28) such that the side papers (43) and (44) before contacting the side walls (41) and (42) overlap the upper and lower facing materials, for example as illustrated in FIG. 4. As the side papers (43) and (44) contact the side walls (41) and (42), they flatten as illustrated in FIG. 5.

When the foam has expanded to fill the thickness of the curing cavity, further expansion is constrained for example by the pressure plates (13) and (14) as illustrated in FIG. 2 and the side walls (41) and (42) as illustrated in FIG. 3 such that pressure is exerted by the foam on the pressure plates and side walls at levels appropriate for the practice of the invention, generally in excess of about 2 pounds per square inch, typically in excess of about 5 pounds per square inch, and preferably in excess of about 6 pounds per square inch.

Processing parameters such as the amounts of the components of the foamable composition, the flow rate of the composition from the distribution device, the temperature of the air circulated inside the conveyors, and the conveyor speed may be varied widely in the practice of the invention such that pressure on the outer surface of the foam is generated within the curing cavity in accordance with the invention.

After the phenolic foam leaves the curing cavity, the side papers (43) and (44) are removed for example by means of rollers (48) and (49) as illustrated in FIG. 3. The foam may be cut to desired lengths depending on the intended use.

Phenolic foams produced using the method of the invention generally have overall densities (i.e. including foam skin) ranging from about 1.5 to about 5.0 pounds per cubic foot (about 24 to about 80 kg/cu. meter) and preferably ranging from about 2.0 to about 3.5 pounds per cubic foot (about 32 to about 56 kg/cu. meter) and core densities (i.e. without foam skin) ranging from about 1.5 to about 4.5 pounds per cubic foot (about 24 to about 72 kg/cu. meter) and preferably ranging from about 2.0 to about 3.0 pounds per cubic foot (about 32 to about 48 kg/cu. meter). The phenolic foams are substantially closed-cell foams generally containing at least 85 percent closed cells, typically at least 90 percent closed cells and preferably greater than 90 percent closed cells as measured for example by an air pycnometer according to test ASTM-D2856-70 (1976).

Phenolic foam produced according to the method of the invention has both an initially low K factor and ability to retain a low K factor for long periods of time. A "low K factor" is understood to mean a K factor below about 0.22 which is approximately the K factor for a foam containing air. An "initial low K factor" is understood to mean a K factor of less than about 0.22 when measured about 24 hours after the foam is initially produced. Phenolic foam produced by the method of the invention generally has an initial K factor of about 0.15 or less, typically about 0.14 or less, and preferably about 0.13 or less. Additionally, phenolic foam produced according to the invention generally retains a K factor after about 10 days aging at room temperature of about 0.15 or less, typically 0.14 or less, and preferably 0.13 or less. When used in the present specification and claims, a phenolic foam having "substantial K factor retention" is understood to retain a K factor of about 0.15 or less after aging at room temperature for about 10 days. It is preferred that the foam retain a K factor less than about 0.22 for more extended periods, as for example after aging at room temperature for about 60 days, for about 90 days or longer. The longer a foam retains a low K factor, the better it is as a thermal insulator.

The phenolic resole resin foamable composition used in the method of the invention generally comprises a phenolic resole resin, a blowing agent, a surfactant, a catalyzing acid and water. However it is to be understood that the practice of the invention in its broadest aspects should not be limited by the specific formulation of the phenolic resole resin foamable composition, provided the phenolic resole resin foamable composition is formulated and quantities of its individual components used so as to provide pressure within the substantially closed volume as previously discussed.

The phenolic resole resin can be prepared by methods generally known involving the reaction of one or more phenolic compounds with one or more aldehydes under alkaline conditions. Generally a mole ratio of phenolic compound to aldehyde is used ranging from about 1:1 to about 1:2, preferably from about 1:1.4 to about 1:1.6.

Although phenol itself preferably is used as the phenolic component for the resole resin, it is to be understood that the teachings of the present invention are also applicable to phenolic resole compositions derived from other phenolic compounds. For example, other compounds having a phenolic hydroxyl group and from two to three unsubstituted ring carbon atoms in the ortho and para position to the phenolic hydroxyl group are suitable. Such compounds include mononuclear phenolic compounds as well as polynuclear phenolic compounds although mononuclear phenolic compounds are preferred, phenol itself being particularly preferred. Polynuclear phenolic compounds are compounds having more than one benzene nucleus to which a phenolic hydroxyl group is bonded.

Examples of suitable mononuclear phenols include: phenol; resorcinol; catechol; hydroquinone; ortho-, meta-, and para-cresols; 2,3-, 2,5-, 3,4- and 3,5-xylenols, 3-ethylphenol; 3,5-diethylphenol and the like. Examples of suitable dinuclear phenolic compounds include: 2,2-bis(4-hydroxyphenyl)propane; 2,2-bis(4-hydroxyphenyl)butane; and 2,2-bis(4-hydroxy-3-methylphenyl)propane and the like. It is to be understood that the above phenolic reactants may be used individually or in combination for the preparation of the phenolic resole resins used in the invention.

Examples of suitable aldehydes for producing the phenolic resole resin include formaldehyde, acetaldehyde, furfural, glyoxal and benzaldehyde. Futhermore, formaldehyde may be used as free formaldehyde, for example in the form of an aqueous solution such as formalin, or in the form of its low molecular weight polymers such as paraformaldehyde. Other substances capable of providing free formaldehyde under the condensation reaction conditions during resole formation may also be used. Of the above aldehydes, formaldehyde, especially as paraformaldehyde, is preferred.

It is particularly surprising that substantially closed-cell phenolic foams having good initial K factor and good K factor retention can be produced according to the method of the invention from resole resins produced essentially from phenol itself and formaldehyde. For example, foams made according to the method of the invention using resole resin produced from phenol itself and paraformaldehyde exhibit better thermal insulating properties than, for example, known free rise foams made essentially from phenol/paraformaldehyde resole resins.

The viscosity of the phenolic resole resins used in the invention generally ranges from about 500 to about 50,000 centipoises at 25° C. Preferably, the viscosity ranges from about 4000 to about 10,000 centipoises at 25° C.

The amount of phenolic resole resin present in foamable compositions used in the invention to produce substantially closed-cell phenolic foams may vary within wide limits provided it is in an amount sufficient to produce such a foam. Generally the amount of phenolic resole resin present in the foamable composition ranges from about 40 percent to about 90 percent by weight of the composition. Typically the amount of phenolic resole resin ranges from about 50 percent to about 80 percent by weight of the composition. An amount in the range of from about 55 percent to about 65 percent by weight of the foamable composition is preferred.

The blowing agent may comprise any suitable blowing agent. Generally the blowing agent comprises halogen-containing blowing agent. Examples of suitable halogen-containing blowing agents include: methylene chloride; chloroform; carbon tetrachloride; monochlorodifluoromethane; dichlorodifluoromethane; 1,2-dichloro-1,1,2,2-tetrafluoroethane; 1,1,1-trichloro-2,2,2-trifluoroethane; 1,2-difluoroethane; trichloromonofluoromethane; 1,1,2-trichloro-1,2,2-trifluoroethane; 1,1,2,2-tetrachloro-1,2-difluoroethane and 1,1,1,2-tetrachloro-2,2-difluoroethane. It is preferred that the blowing agent comprise a fluorine-containing blowing agent. The blowing agent may be a single blowing agent compound or it may be a mixture of such compounds. Ordinarily the halogen-containing blowing agents employed have boiling points at atmospheric pressure, viz., an absolute pressure of 760 millimeters of mercury, in the range of from about $-5°$ C. to about 55° C. An atmospheric boiling point in the range of from about 20° C. to about 50° C. is typical. The preferred blowing agent is a mixture of trichloromonofluoromethane and 1,1,2-trichloro-1,2,2-trifluoroethane. It is especially preferred that the weight ratio of the trichloromonofluoromethane to the 1,1,2-trichloro-1,2,2-trifluoroethane in the mixture be about 1:1.

The blowing agent generally is present in the foamable composition in an amount which will produce substantially closed-cell phenolic foam having an initial low K factor. The amount of blowing agent may vary widely but it generally ranges from about 1 percent to about 20 percent by weight of the foamable composition. An amount of blowing agent in the range of from about 5 percent to about 15 percent by weight of the foamable composition is typical. An amount in the range of from about 8 percent to about 13 percent by weight is preferred.

The surfactant should exhibit properties which enable it to effectively emulsify the contents of the foamable composition. To prepare a good foam, the surfactant should lower the surface tension and stabilize the foam cells during expansion. Ordinarily, a silicone surfactant is used, although any surfactant having the requisite properties described above may be employed. Specific examples of suitable surfactants include L-7003 silicone surfactant, L-5340 silicone surfactant and L-5310 silicone surfactant, all from Union Carbide Corporation, and SF-1066 silicone surfactant from General Electric Company.

The surfactant used in the foamable composition may be a single surfactant or a mixture of surfactants. The surfactant is used in the present invention in an amount sufficient to produce an emulsion. Generally the amount of surfactant ranges from about 0.1 percent to about 10 percent by weight of the foamable resole-resin composition. Typically the amount of surfactant ranges from about 1 percent to about 6 percent of the composition. An amount of surfactant in an amount of from about 2 percent to about 4 percent by weight of the composition is preferred.

Ordinarily some water is desirable in the foamable composition to adjust the viscosity of the composition to that which is favorable for producing foams. Although the water present in the foamable composition probably vaporizes and contributes to the generation of the pressure in the substantially closed volume, water is not regarded as particularly advantageous as a blowing agent. Therefore, as used herein, the term "blowing agent" is understood not to include water. The water may be added in admixture with some or all of the other components of the foamable composition. The water may be added directly by itself or in combination with any of the previously described components. Ordinarily, some water is introduced to the composition in admixture with the phenolic resole resin and some is introduced in admixture with the catalyzing acid.

When water is present in the foamable composition, it is in a viscosity adjusting amount. Generally the amount of water ranges from about 2 percent to about 40 percent by weight of the foamable composition. Typically the amount of water ranges from about 5 percent to about 30 percent by weight of the composition. An amount of water ranging from about 10 percent to about 25 percent by weight of the foamable composition is preferred.

The catalyzing acid component serves to catalyze the reaction of the resole resin to form a thermoset polymer during foam formation. The catalyzing acid may be a generally known inorganic acid or organic acid for acid catalyzing phenolic foam formation. Examples of suitable catalyzing acids include: hydrochloric acid; sulfuric acid; fluoboric acid; phosphoric acid; formic acid; acetic acid; oxalic acid; mixtures of acidic catalysts based on boric acid or its anhydride with organic hydroxy acids having a hydroxyl group or a carbon atom no more than one carbon atom removed from the carboxyl group such as oxalic acid as described in U.S. Pat. No. 3,298,973; and other acid catalysts known in the art of phenolic foam formation. Examples of other suitable catalyzing acids include organic sulfonic acids such as benzene sulfonic acid; toluene sulfonic acid; xylene sulfonic acid; butane sulfonic acid and the like; as well as resin sulfonic acids such as the phenol/sulfuric acid/-formaldehyde reaction products described in British Pat. No. 1,283,113.

Preferred catalyzing acids are those disclosed in copending application, U.S. Ser. No. 138,476 filed Apr. 9, 1980 now abandoned directed to phenolic foam compositions. These catalyzing acids include an aromatic sulfonic acid from the group consisting of phenolsulfonic acid, cresolsulfonic acid, xylenesulfonic acid and mixtures thereof; and an alkanesulfonic acid from the group consisting of methanesulfonic acid, ethanesulfonic acid, and mixtures thereof. Preferably, the catalyzing acid used in the present invention consists essentially of the aromatic sulfonic acid and the alkane-sulfonic acid, particularly phenolsulfonic acid and methanesulfonic acid.

Generally, the amount of aromatic sulfonic acid, when present, ranges from about 30 percent to about 95 percent by weight of the catalyzing acid, an amount ranging from about 50 percent to about 80 percent of the catalyzing acid being preferred. Generally the amount of alkanesulfonic acid, when present, ranges from about 5 percent to about 70 percent by weight of the catalyzing acid, an amount ranging from about 20 percent to about 50 percent of the catalyzing acid being preferred.

A single aromatic sulfonic acid may be employed as the aromatic sulfonic acid constituent of the catalyzing acid or a mixture of such acids may be employed. When a mixture is used, the individual aromatic sulfonic acids may be from the same class, as for example, all may be phenolsulfonic acid, cresolsulfonic acids or xylenolsulfonic acids, or they may be from different classes. The preferred aromatic sulfonic acid is phenolsulfonic acid. Particularly preferred is commercial phenolsulfonic acid which is primarily a mixture of o-phenolsulfonic acid and p-phenolsulfonic acid, with perhaps some m-phenolsulfonic acid also present.

The alkane sulfonic acid constituent of the catalyzing acid may be methanesulfonic acid, ethanesulfonic acid or a mixture of these two acids.

The amount of catalyzing acid present in the foamable composition may vary widely but generally ranges from about 2 percent to about 35 percent by weight of the composition. Typically the amount of catalyzing acid ranges from about 5 percent to about 30 percent by weight of the foamable composition. An amount of catalyzing acid ranging from about 6 percent to about 20 percent by weight of the composition is preferred.

When, as is preferred, the catalyzing acid consists essentially of the aromatic sulfonic acid and the alkanesulfonic acid, the aromatic sulfonic acid is usually present in an amount in the range of from about 0.6 percent to about 33.25 percent by weight of the foamable composition and the alkanesulfonic acid is usually present in an amount in the range of from about 0.1 percent to about 24.5 percent by weight of the foamable composition. Typically the amount of aromatic sulfonic acid is in the range of from about 1.5 percent to about 28.5 percent by weight of the foamable composition and the amount of alkanesulfonic acid is in the range of from about 0.25 percent to about 21 percent by weight of the composition. Preferably the amount of aromatic sulfonic acid is in the range of from about 3 percent to about 16 percent by weight of the foamable composition and the amount of alkanesulfonic acid is in the range of from about 1.2 percent to about 10 percent by weight of the composition.

The proportions and amounts of catalyzing acid and its constituents described above are calculated in respect to anhydrous acids.

Other materials known to the art may be added in their customary amounts for their customary purposes so long as they do not seriously interfere with good foam practice.

Any substantially closed volume may be used in the present invention. The walls defining this volume may be of any size, shape and material provided they are capable of withstanding the pressure generated within the volume in the practice of the invention. Generally a pressure in excess of about 2 pounds per square inch is attained on the walls defining this volume. Typically a pressure in excess of about 5 pounds per square inch is attained. Preferably a pressure is attained in excess of about 6 pounds per square inch. Unless otherwise specified, pressure values given in the present specification are understood to mean gauge pressures, that is, pressures in excess of an ambient atmospheric pressure of about 1 atmosphere. Some specific examples of suitable substantially closed volumes for the practice of the invention include a substantially closed mold or a curing cavity of a continuous foam forming machine.

The maximum pressure generated by the foam forming composition in the substantially closed volume will vary depending, for example, on the density of the phenolic foam being produced. Generally a maximum pressure is attained ranging up to about 30 pounds per square inch, typically up to about 15 pounds per square inch gauge pressure.

Curing of the foamable composition is exothermic and the temperature during cure varies. Generally, curing is accomplished at a temperature in the range of from about 4° C. to about 122° C. Curing temperatures of from about 15° C. to about 99° C. are preferred.

The method of the invention is useful in the production of phenolic foam thermal insulation for widely varying domestic and industrial uses. The invention is particularly advantageous as a method of producing phenolic foams having excellent insulation properties from foamable compositions based on resole resins produced from relatively low cost phenol and formaldehyde preferably as paraformaldehyde. Phenolic foam produced according to the method of the invention exhibits not only a good initial K-factor but also good K-factor retention unlike phenolic foams generally known in the art. Thus, the method of the invention meets a long sought-after but heretofore unrealized goal of producing a phenolic foam having both good initial K-factor and good K-factor retention from phenolic resole resins such as simple phenol/formaldehyde resole resins and thereby represents an important advancement in the phenolic foam art.

The following examples illustrate the invention. Parts and percentages are by weight unless specified otherwise.

EXAMPLE I (a) Preparation of a phenol-formaldehyde resole resin

A reactor equipped with a thermometer, a stirrer, a heater and a reflux condenser was charged with 1500 grams of an aqueous, 90 percent phenol solution (14.4 moles phenol) and 1690 grams of an aqueous, 37 percent formaldehyde solution (20.8 moles formaldehyde). The phenol-formaldehyde mixture was heated to 40° C. and 36 grams of an aqueous 12.5 percent sodium hydroxide solution was added. The mixture was then slowly heated for 86 minutes to a temperature of 98° C. and then a second 36 grams of aqueous 12.5 percent sodium hydroxide solution was added. The temperature was maintained at 98° C. and for 15 minutes and then a third 36 grams of the 12.5 percent sodium hydroxide solution added. The temperature was controlled to within about 1° C. for another 15 minutes and then a fourth 36 grams of the 12.5 percent sodium hydroxide solution added. The temperature of the mixture was held at 99° C. for 59 minutes and then cooled to 80° C. in 5 minutes. The mixture was maintained at 80° C. for an hour and then cooled in 18 minutes to 30° C. whereupon 37.8 ml of an aqueous, 45 percent formic acid solution was added. The mixture was then stirred for 17 minutes at 30° C. and a pH reading of 5.4 taken. The resulting phenol-formaldehyde resole resin was then stripped under nitrogen at reduced pressure. The resin had a Brookfield viscosity at 20° C. of 4300 centipoises. The resin had a residual formaldehyde content of 0.7 percent, a hydroxyl value of 659, a water content of 16.3 percent, and a solids content of 81.01 percent.

(b) Preparation of a foam

A foamable composition was prepared by mixing 55 parts of the phenol-formaldehyde resole resin described immediately above, 1.4 parts of L-5310 silicone surfactant, 4.6 parts of 1,1,2-trichloro-1,2,2-trifluoroethane, 2.3 parts of trichloromonofluoromethane, 3.2 parts of aqueous 50 percent sulfuric-acid, and 3.2 parts of ethylene glycol. 160 grams of the foamable composition was stirred for 20 seconds and poured into a 12 inch by 12 inch by 1 inch mold which had been preheated to 37.8° C. The mold was clamped closed leaving narow apertures at only the mold edges. The mold was placed in a curing oven at 54.4° C. for 24 hours wherein the foamable composition expanded to seal off the apertures and create pressure in excess of about 2 pounds per square inch on the walls of the mold.

The resulting foam had a density of 4.08 pounds per cubic foot (65.4 kg/cu. meter), an initial K factor of 0.127, a K factor after aging 12 days of 0.148, and a K factor after 31 days of 0.221.

EXAMPLE II (a) Preparation of two phenol-formaldehyde resole resins (i) Part (a) of EXAMPLE I was repeated through the addition of the first 36 grams of aqueous 12.5 percent sodium hydroxide. The mixture was then slowly heated for 1 hour and 35 minutes to a temperature of 99° C. and then a second 36 grams of aqueous 12.5 percent sodium hydroxide was added. The temperature was held at 99° C. for 15 minutes and then a third 36 grams of 12.5 percent sodium hydroxide was added. The temperature was controlled to within about 1° C. for another 15 minutes and then a fourth 36 grams of 12.5 percent sodium hydroxide solution added. The mixture was cooled over a period of 30 minutes to 92° C. where the temperature was maintained for an additional 30 minutes. The mixture was then cooled over a period of 2 minutes to 80° C. and held at 80° C. for 1 hour. The mixture was then cooled within 18 minutes to 30° C. and a total of 34 ml of an aqueous 48.5 percent formic acid solution was added. The phenol-formaldehyde resole resin was then stripped under nitrogen at reduced pressure. The resin had a viscosity of 6000 centipoises at 20° C., a residual formaldehyde content of 0.65 percent, a hydroxyl value of 673, a water content of 16.3 percent, and a solids content of 76.0 percent.

(ii) A reactor equipped with a thermometer, a stirrer, a heater and a reflux condenser was charged with 1500 grams of an aqueous 90 percent phenol solution and 24 grams of barium hydroxide. This mixture was heated to 40° C. and 330 grams of 91 percent paraformaldehyde was added. The mixture was heated 25 minutes to a temperature of 105° C. and then cooled to 85° C. over a period of 90 minutes. Then another 330 grams of the 91 percent paraformaldehyde were added and the temperature was held at 85° C. for 1 hour. The mixture was then cooled within 15 minutes to 30° C. and 6 grams of aqueous 48.5 percent formic acid was added. The phenol-formaldehyde resole resin was then stripped under nitrogen at reduced pressure. The resin had a viscosity of 4200 centipoises at 20° C., a residual formaldehyde content of 3.2 percent, a hydroxyl value of 807, a water content of 3.9 percent and a solids content of 72.74 percent.

(b) Preparation of a foam

A foamable composition was prepared by mixing 105 parts of the phenol-formaldehyde resole resin described in part (a)(i) immediately above, 45 parts of the phenol-formaldehyde resin described in part (a)(ii) immediately above, 3.6 parts of L-5310 silicone surfactant, 15.0 parts of 1,1,2-trichloro-1,2,2-trifluoroethane, 9.6 parts of ethylene glycol, and 14.4 parts of aqueous 50 percent sulfuric acid. The mixture was stirred for 15 seconds and poured into a 12 inch by 12 inch by 1 inch aluminum mold at room temperature. The mold was clamped closed leaving narrow apertures at only the mold edges. The foamable composition was allowed to expand at room temperature for 1 minute to seal the apertures in the mold. The mold then was placed in a curing oven at 76.7° C. for 16 hours and 15 minutes wherein a pressure in excess of about 2 pounds per square inch was attained.

The cured foam contained 85 percent closed cells as measured using an air pycnometer according to test ASTM-D2856-70 and had a density of about 3.5 pounds per cubic foot (56 kg/cu. meter). The foam had an initial K factor of 0.121.

The K factors of the foam upon aging are set forth in the following Table I.

TABLE I

| Aging Period | K Factor |
| --- | --- |
| 12 days | 0.116 |
| 13 days | 0.120 |
| 33 days | 0.134 |
| 61 days | 0.197 |

A comparison of the data of EXAMPLE II shows that the K factor decreased for a short period after the initial measurement. Although the factor(s) responsible for this decrease are not completely understood, it is believed that upon formation of the foam, the cells contain not only halogen-containing gases but also water in the form of vapor, liquid, or both vapor and liquid. Since the water molecules are smaller than the halogen containing gases, the water molecules are able to diffuse outwardly at a faster rate. Also, since water has a higher thermal conductivity than the halogen-containing gases, the result is an initial decrease in the observed K factor of the foam. As the effect of diffusion of water molecules decreases, the effect of the slower outward diffusion of the halogen containing gases is manifested by a gradual increase in K factor upon further aging. Whether or not the temporary decrease in K factor is observed or not depends upon the times of observation in relation to the duration of the effect.

EXAMPLE III (a) Preparation of two phenol formaldehyde resins (b) Part (a) of EXAMPLE I was repeated through the addition of the first 36 grams of aqueous 12.5 percent sodium hydroxide. The mixture was then slowly heated for 90 minutes to a temperature of 99° C. and then a second 36 grams of 12.5 percent sodium hydroxide was added. The temperature was maintained between 99° C. and 98° C. for 15 minutes and then a third 36 grams of 12.5 percent sodium hydroxide was added. The temperature was controlled to within about 2° C. for another 15 minutes and then a fourth 36 grams of the 12.5 percent sodium hydroxide solution was added. The temperature of the mixture then slowly dropped within 1 hour to 92° C. and to 80° C. and held at about 80° C. for an additional hour. The mixture was then cooled to 30° C. and 34 ml of aqueous 48.5 percent formic acid was added so that the mixture had a pH of 6.54. The phenol-formaldehyde resole resin was stripped under nitrogen at reduced pressure. The resin had a viscosity of 6800 centipoises at 20° C., a residual formaldehyde content of 0.62 percent, a hydroxyl value of 661, a water content of 11 pecent, and a solids content of 82.4 percent.

(ii) Part (a)(ii) of EXAMPLE II was repeated through the addition of 330 grams of 91 percent paraformaldehyde at 40° C. The mixture was heated 30 minutes to a temperature of 110° C. and then allowed to cool to 85° C. in the next 5 minutes. The temperature of the mixture was held at about 85° C. for 1.5 hours after which a second 330 grams of 91 percent paraformaldehyde were added. The temperature was held at about 85° C. for 1 hour and then cooled to 30° C. The phenol-formaldehyde resole resin was then stripped under nitrogen at reduced pressure. The resin had a viscosity of 1800 centipoises at 20° C., a residual formaldehyde content of 3.95 percent, a water content of 3.6 percent, and a solids content of 61.8 percent.

(b) Preparation of a foam

A foamable composition was prepared by mixing 105 parts of the phenol-formaldehyde resole resin described in part (a)(i) immediately above, 45 parts of the phenol-formaldehyde resin described in part (a)(ii) immediately above, 3.6 parts of L-5310 silicone surfactant, 1,5 parts of 1,1,2-trichloro-1,2,2-trifluoroethane, 9.6 parts of ethylene glycol, and 14.4 parts of aqueous 50 percent sulfuric acid. The foamable composition was stirred for 15 seconds and poured into a 12 inch by 12 inch by 1 inch aluminum mold which had been preheated to 71.1° C. The mold was clamped closed leaving narrow aperatures at only the mold edges. The mold was placed in a curing oven at 71.1° C. for 17 hours wherein the foamable composition expanded to seal off the apertures and create pressure in accordance with the invention on the walls of the mold.

The resulting foam had a density of 3.8 pounds per cubic foot (61 kg/cu. meter) and an initial K factor of 0.123. The K factors of the foam upon aging are set forth in the following Table II.

TABLE II

| Aging Period | K Factor |
|---|---|
| 12 days | 0.117 |
| 31 days | 0.128 |
| 62 days | 0.144 |
| 160 days | 0.190 |

EXAMPLE IV (a) Preparation of two phenol-formaldehyde resole resins (i) A reactor equipped with a thermometer, a stirrer, a heater and a reflux condenser was charged with 450 grams of solid phenol, 220 grams of aqueous 91 percent paraformaldehyde, 19 grams of water, and 6 grams of aqueous 50 percent sodium hydroxide. The mixture was heated to 100° C. The mixture then exothermed to 125° C. within 3 minutes after reaching 100° C. and was cooled to 100° C. Then, within 57 minutes the temperature of the mixture fell to 95° C. whereupon it was cooled to 80° C. whereupon it was cooled to 80° C. within an additional 35 minutes. At 80° C., 7.0 grams of aqueous 45.5 percent formic acid were added to the mixture which was then allowed to cool to room temperature. The resulting phenol-formaldehyde resole resin had a viscosity of 5200 centipoises, a residual formaldehyde content of 0.75 percent a water content of 12.7 percent, a hydroxyl value of 685, and a solids content of 81.3 percent.

(ii) A reactor equipped as described above was charged with a mixture of 1690 grams of aqueous 37 percent formaldehyde and 24 grams of barium hydroxide. The mixture was heated to 40° C. and then 375 grams of aqueous 90 percent phenol was added. This mixture was heated for 105 minutes to a temperature of 99° C. whereupon another 375 grams of 90 percent phenol solution was added. The mixture was cooled for 30 minutes to 85° C. whereupon another 375 grams of the 90 percent phenol solution was added. The temperature was held at about 85° C. for 30 minutes whereupon a final 375 grams of the 90 percent phenol solution was added. The mixture was maintained in the range of 85° C. to 80° C. for 90 minutes and then cooled to 30° C. whereupon 6 ml of aqueous 48.5 percent formic acid was added. The resulting phenol-formaldehyde resole resin, after stripping under nitrogen at reduced pressure, had a viscosity of 400 centipoises, a residual formaldehyde content of 3.4 percent, a water content of 3.4 percent, a hydroxyl value of 747, and a solids content of 43.7 percent.

(b) Preparation of a foam

A foamable composition was prepared by mixing 120 parts of the phenol-formaldehyde resole resin described in part (a)(i) immediately above, 30 parts of the phenol-formaldehyde resole resin described in part (a)(ii) immediately above, 3.6 parts of L-5310 silicone surfactant, 15 parts of 1,1,2-trichloro-1,2,2-trifluoroethane, 9.6 parts of ethylene glycol, and 14.4 parts of aqueous 50 percent sulfuric acid. The mixture was stirred for 12 seconds and poured into a 12 inch by 12 inch by 1 inch aluminum mold preheated to 70° C. The mold was clamped closed as in EXAMPLE 1(b) and placed in a curing oven at 70° C. for 16 hours wherein the foamable composition expanded to seal the apertures and create pressure in accordance with the invention on the walls of the mold.

The cured foam had a density of about 3.7 pounds pe cubic foot (59 kg/cu. meter). The foam had an initial K factor of 0.126. The K factors of the foam upon aging are set forth in the following TABLE III.

TABLE III

| Aging Period | K Factor |
| --- | --- |
| 11 days | 0.120 |
| 64 days | 0.125 |
| 90 days | 0.130 |
| 120 days | 0.128 |
| 156 days | 0.132 |
| 305 days | 0.140 |
| 341 days | 0.143 |
| 363 days | 0.142 |
| 500 days | 0.154 |

EXAMPLE V (a) Preparation of a phenol-formaldehyde resin

A catalyst composition was prepared by admixing 6 grams of potassium hydroxide pellets of about 85% purity and 3.6 grams of water.

A feed composition was prepared by admixing 1044 grams of aqueous 90 percent phenol and 9.6 grams of the above catalyst composition.

A reactor equipped with a thermometer, an agitator, a heater and a reflux condenser was charged with 1044 grams of 90 percent phenol, 990 grams of 91 percent paraformaldehyde and 100 milliliters of the feed composition was added. Thereafter, additions of the feed composition were made according to the following schedule:

| Time Interval Since Last Addition, minutes | Reaction Mixture Temperature, °C. | Feed Composition Added, milliliters |
| --- | --- | --- |
| 10 | 70 | 100 |
| 10 | 70 | 100 |
| 10 | 70 | 100 |
| 10 | 80 | 100 |
| 10 | 80 | 100 |
| 10 | 80 | 100 |
| 10 | 80 | 100 |
| 10 | 80 | 100 |

Five minutes later, the temperature was 90° C. The reaction mixture was then held at 90° C. for 5¾ hours. At the conclusion of this period, cooling was begun. Twenty-five minutes later the temperature was 78° C. and cooling was discontinued. The reaction mixture was held at 78° C. to 79° C. for 2 hours and 5 minutes. An addition of 4.5 grams of aqueous 90 percent formic acid was made and the reaction mixture was cooled and stored under refrigeration. The resulting phenol-formaldehyde resole resin had a viscosity of 6800 centipoises at 25° C.

(b) Preparation of a foam

A foamable composition was prepared by mixing 74.6 parts of the phenol-formaldehyde resole resin described immediately above, 3.4 parts of L-7003 silicone surfactant, 5 parts of 1,1,2-trichloro-1,2,2-trifluoroethane, 5 parts of trichloromonofluoromethane, 9 parts of 65 percent aqueous phenolsulfonic acid, and 3 parts of aqueous 70 percent methanesulfonic acid. The mixture was poured into a preheated 10½ inch by 14 inch by 1½ inch aluminum mold coated with mold release agent. The mold was then clamped closed as in Example I(b) and placed in an oven at 71.1° C., for fifteen minutes wherein the foamable composition expanded to seal the apertures and create pressure in accordance with the invention on the walls of the mold.

The cured foam had a density of about 3.5 pounds per cubic foot (56 kg/cu. meter) and an initial K factor of 0.124. The K factors of the foam upon aging are set forth in the following TABLE IV.

TABLE IV

| Aging Period | K Factor |
| --- | --- |
| 10 days | 0.139 |
| 100 days | 0.144 |
| 183 days | 0.147 |

EXAMPLE VI (a) Preparation of a phenol-formaldehyde resole resin

A catalyst composition was prepared by mixing 403.2 grams of potassium hydroxide of about 85 percent purity with 241.9 grams of water.

A reactor equipped with a thermometer, an agitator, a heater, a cooler and a total reflux condenser was charged with 149.7 pounds (67.95 kg) of aqueous 90 percent phenol and 142.1 pounds (64.5 kg) of 91 percent paraformaldehyde flakes. The reactor was then charged with 15 pounds of 90 percent phenol and 40 ml of the above catalyst composition. The charged materials were heated to 66.1° C. and another 15 pounds (6.8 kg) of aqueous 90 percent phenol and 40 milliliters of the above catalyst composition were added. 15 minutes later another 15 pounds of 90 percent phenol and 40 ml of catalyst were added when the temperature of the reaction mixture was 68.9° C. The reaction mixture was heated for 15 minutes to 73.3° C. and another 15 pounds of 90 percent phenol and 40 ml of catalyst were added. The reaction mixture was then heated to 82.2° C. over a five minute period and another addition of phenol and catalyst in the same proportions as above made. Four more additions of phenol and catalyst in the same proportions as above were made at 10 minute intervals when the temperatures respectively were 80.0°, 82.8°, 83.3°, and 82.2° C. At the end of an additional 10 minute interval, 14.7 pounds (6.7 kg) of 90 percent phenol and 40 ml of the above catalyst composition were added when the temperature was 82.8° C. The reaction mixture was then heated for 10 minutes to a temperature of 87.8° C. For the next 3 hours and 55 minutes the reaction mixture was held at a temperature in the range of from 85.6° C. to 89.4° C. and then cooled over the next 1 hour and 50 minutes to a temperature of 80° C. at which point 282.3 grams of aqueous 90 percent formic acid was added.

(b) Preparation of 6 foams

A foamable composition was prepared by mixing 68.6 parts of the phenol-formaldehyde resole resin described in part (a) immediately above, 3.4 parts of L-7003 silicone surfactant, 6 parts of ortho-cresol, 5 parts of 1,1,2-trichloro-1,2,2-trifluoroethane, 5 parts of trichloromonofluoromethane, 3 parts of aqueous 70 percent methane sulfonic acid, and 9 parts of aqueous 65 percent phenol sulfonic acid.

The mixtures were poured into molds coated with mold release agent. The molds were equipped with a pressure gauge as illustrated schematically in FIG. 1A. The molds were clamped closed having narrow apertures at only the mold edges and placed in a curing oven at 71.1° C. for 15 minutes. The foamable composition expanded to seal the apertures and create pressure on the walls of the molds. Gauge pressure readings were taken after the molds were placed in the curing oven, which pressure readings and times are given in the following TABLE V. Overall foam densities, core densities, and K factors for the cured foams also are included in TABLE V.

TABLE V

| Foam No. | Pressure Reading | | Time | Overall Density | | Core Density | | K Factor (Aged 30 days) | K Factor (Aged 10 days) | K Factor (Aged 30 days) |
|---|---|---|---|---|---|---|---|---|---|---|
| | (lb/sq. inch) | (newtons/ sq. cm) | | (lbs./ cu. ft.) | (kg/ cu. meter) | lbs/cu. ft. | (kg/cu. meter) | | | |
| 1* | 8 | 5.5 | 6 mins. | 3 | 48 | 2.084 | 33.38 | 0.128 | 0.131 | 0.132 |
| 2* | 9 | 6 | 5 mins. | 3.5 | 56 | 2.431 | 38.99 | 0.138 | 0.164 | NM |
| 3** | 9 | 6 | 4 mins. | 3.0 | 48 | 2.084 | 33.38 | 0.137 | 0.157 | 0.182 |
| 4** | 10.5 | 7.24 | 4 mins. | 3.5 | 56 | 2.51 | 40.2 | 0.138 | 0.155 | 0.183 |
| 5** | 9 | 6 | 6 mins. | 3.0 | 48 | 2.136 | 34.21 | 0.147 | 0.188 | NM |
| 6** | 6 | 4 | 6 mins. | 2.7 | 43 | 1.954 | 31.30 | 0.133 | 0.149 | 0.178 |

\* = measured on a 60 psi gauge
\*\* = measured on a 15 psi gauge
NM = not measured

EXAMPLE VII (a) Preparation of two phenol-formaldehyde resole resins (i) A catalyst composition was prepared by mixing 8.46 parts of potassium hydroxide of about 85 percent purity and 7.52 parts of deionized water.

A feed composition was prepared by mixing 1425 parts of aqueous 90 percent phenol and 15.98 parts of the above catalyst composition.

A reactor equipped with a thermometer, an agitator, a heater, a cooler, and a total reflux condenser was condenser was charged with 1425 parts of aqueous 90 percent phenol and 1352.7 parts of 91 percent paraformaldehyde flakes. The charged materials were heated to 79.4° C. Over a period of 2 hours and 55 minutes, while the temperature was in the range of from 71.1° C. to 86.7° C., 1440.98 parts of the above feed composition was added. The reaction mixture was then heated for 10 minutes to 83.9° C. and then held in the range of 82.8° C. to 86.1° C. for 7 hours and 15 minutes. The reaction mixture was then cooled for 2 hours and 10 minutes to 71° C. and 5.92 parts of aqeuous 90 percent formic acid was added. The reaction mixture was further cooled for 1 hour to 54.4° C. and 190 parts of liquid ortho-cresol was added.

The product, a phenol-formaldehyde resole resin, had a viscosity of 3000 centipoises at 25° C.

(ii) Part (i) immediately above was repeated through the charging of the reactor with 1425 parts of 90 percent phenol and 1352.7 parts of 91 percent paraformaldehyde flakes.

The charged materials were heated to 79.4° C. Over a period of 3 hours and 35 minutes, while the temperature was in the range of from 73.9° C. to 82.2° C., 1440.98 parts of the above feed composition was added. The reaction mixture was then heated for 25 minutes to 85° C. and then maintained in the range of 79.4° C. to 86.1° C. for 8 hours and 15 minutes. The reaction mixture was then cooled over a period of 10 minutes to 77.2° C. and 5.92 parts of aqueous 90 percent formic acid was added. The reaction mixture was then cooled over a period of 65 minutes to 54.4° C. and 190 parts of liquid ortho-cresol was added.

The product, a phenol formaldehyde resol resin had a viscosity of 3,500 centipoises at 25° C.

(b) Foam Production

A resole resin feed composition was prepared by mixing equal parts of the two phenol-formaldehyde resol resins described in parts (a)(i) and (a)(ii) above and then combining 67.1 parts of the resulting mixture with 2.4 parts of L-7003 silicone surfactant.

A catalyst feed composition was prepared by mixing 10 parts of aqueous 65 percent phenol sulfonic acid, 6 parts of aqueous 70 percent methane sulfonic acid, 1.5 parts of aqueous 50 percent resorcinol and 1 part of L-7003 silicone surfactant.

The resole resin feed composition, catalyst feed composition and a blowing agent containing 6 parts of 1,1,2-trichloro-1,2,2-trifluoroethane, 6 parts of trichloromonofluoromethane and 1 part of L-7003 silicone surfactant were separately fed to and mixed in a distribution device of a phenolic foam machine as illustrated schematically in FIG. 2.

The resole resin feed composition, catalyst feed composition, and blowing agent were kept at temperatures in the ranges respectively of 15.6° to 21.1° C., 15.6° to 18.3° C., and 4.4° C. prior to mixing in the distribution device.

The foamable composition was applied continuously for 1 hour and 42 minutes to a lower facing sheet of aluminized cardboard moved by the lower conveyor. An upper facing sheet of the same material and side papers coated with polyethylene were fed to the machine just ahead of the curing cavity as illustrated in FIGS. 2 and 3. During the next 1 hour and 10 minutes, the machine was stopped while the application device was replaced. The machine was reactivated and foamable composition was applied continuously for another 1 hour and 33 minutes.

The relative amounts of resole resin, catalyst, and blowing agent in the foamable composition were determined at eight times during the total 4 hour and 25 minute run (including the 1 hour and 10 minute down time) and are as reported in the following TABLE VI.

TABLE VI

| Time Number | Total Time Elapsed | Parts Resin | Parts Catalyst | Parts Blowing Agent |
|---|---|---|---|---|
| 1. | 5 mins. | 72.9 | 16.2 | 10.9 |
| 2. | 10 mins. | 71.9 | 16.8 | 11.3 |
| 3. | 97 mins. | 68.2 | 20.7 | 11.1 |
| 4. | 177 mins. | 67.4 | 21.0 | 11.6 |
| 5. | 192 mins. | 68.9 | 20.4 | 10.8 |
| 6. | 222 mins. | 67.0 | 21.6 | 11.4 |
| 7. | 242 mins. | 62.6 | 25.8 | 11.6 |

TABLE VI-continued

| Time Number | Total Time Elapsed | Parts Resin | Parts Catalyst | Parts Blowing Agent |
|---|---|---|---|---|
| 8. | 252 mins. | 63.6 | 25.6 | 10.8 |

The temperature of the conveyors was maintained in the range of 58.3° C. to 67.2° C. during the run.

The foamable composition was applied to the lower facing material and the conveyor speed adjusted such that once the foam had expanded to substantially fill the curing cavity, further expansion was prevented and pressure was generated within the curing cavity.

A pressure measurement, taken in the curing cavity after about 3 hours into the run at about ¾ of the way from the entrance of the curing cavity, indicated a gauge pressure generated by the foam within the cavity of 12 pounds per square inch (8.3 newtons/square cm). Temperature measurements of the foam just after exiting the curing cavity were taken during the first 3 hours and 2 minutes of the run and ranged from 96° C. to 101° C.

Sixteen product foam samples were cut in groups of 2, each group closely representing the foam produced from the foamable compositions given for the eight times listed in TABLE VI. The initial K factor, K-factors after aging, and core densities of the foam sample groups produced from the eight foamable compositions represented in TABLE VI respectively are in the following TABLE VII.

TABLE VII

| Sample Group No. | Core Density (lb/cubic ft.) | Core Density (Kg Cubic Meter) | K Factor (Aged 1 day) | K Factor (Aged 10 days) | K Factor (Aged 30 days) | K Factor (Aged 58 days) | K Factor (Aged 90 days) | K Factor (Aged 160 days) |
|---|---|---|---|---|---|---|---|---|
| 1 | 2.15 | 34.4 | 0.120 | * | * | 0.165 | 0.177 | 0.191 |
|   | 2.17 | 34.8 | 0.117 | 0.122 | 0.149 | 0.169 | 0.176 | 0.207 |
| 2 | 2.12 | 34.0 | 0.117 | * | * | 0.127 | 0.187 | 0.162 |
|   | 2.18 | 34.9 | 0.117 | 0.147 | 0.158 | 0.164 | 0.164 | 0.198 |
| 3 | 2.43 | 38.9 | 0.127 | * | * | 0.121 | 0.123 | 0.152 |
|   | 2.48 | 39.7 | 0.120 | 0.109 | 0.110 | 0.120 | 0.121 | 0.144 |
| 4 | 2.51 | 40.2 | 0.127 | * | * | 0.121 | 0.123 | 0.146 |
|   | 2.52 | 40.4 | 0.122 | 0.110 | 0.110 | 0.117 | 0.125 | 0.150 |
| 5 | 2.59 | 41.5 | 0.128 | * | * | 0.164 | 0.174 | 0.207 |
|   | 2.76 | 44.2 | 0.127 | 0.145 | 0.172 | 0.183 | 0.188 | 0.226 |
| 6 | 2.68 | 42.9 | 0.122 | * | * | 0.116 | 0.122 | 0.146 |
|   | 2.71 | 43.4 | 0.130 | 0.164 | 0.190 | 0.196 | 0.200 | 0.230 |
| 7 | 2.78 | 44.5 | 0.127 | * | * | 0.134 | 0.144 | 0.164 |
|   | 2.85 | 45.7 | 0.123 | 0.113 | 0.120 | 0.135 | 0.135 | 0.153 |
| 8 | 2.94 | 47.1 | 0.117 | * | * | 0.119 | 0.122 | 0.142 |
|   | 2.93 | 46.9 | 0.126 | 0.115 | 0.126 | 0.141 | 0.138 | 0.162** |

\* = not measured
\*\* = aged 161 days
Additionally the percentage of closed cells was measured for Sample Group No. 4 and was 93 percent closed cells.

What is claimed is:

1. A method for making a phenolic foam having an initial K factor less than 0.15 and having substantial K factor retention from a phenolic resole resin foamable composition comprising from 40 to 90 percent by weight phenolic resole resin, from 1 to 20 percent by weight fluorine containing blowing agent, from 0.1 to 10 percent by weight surfactant, from 2 to 40 percent by weight water and from 2 to 35 percent by weight acid catalyst comprising introducing the phenolic resole resin foamable composition into a substantially closed volume wherein the composition is allowed to foam under initially ambient atmospheric pressure until the foam fills the volume and wherein a pressure in excess of about 2 pounds per square inch on the outer surface of the foam is attained within the volume and wherein the temperature during foaming is from about 4° C. to 122° C.

2. A method as in claim 1 wherein a pressure in excess of about 5 pounds per square inch on the outer surface of the foam is attaned within the volume.

3. A method for making a phenolic foam having an initial K factor less than 0.15 and having substantial K factor retention from a phenolic resole resin foamable composition comprising from 50 to 80 percent by weight phenolic resole resin, from 5 to 15 percent by weight fluorine containing blowing agent, from 1 to 6 percent by weight surfactant, from 5 to 30 percent by weight water and from 5 to 30 percent by weight acid catalyst comprising introducing the phenolic resole resin foamable composition into a substantially closed volume wherein the composition is allowed to foam under initially ambient atmospheric pressure until the foam fills the volume and wherein a pressure in excess of about 2 pounds per square inch on the outer surface of the foam is attained within the volume and wherein the temperature during foaming is from about 4° C. to 122° C.

4. A method as in claim 3 wherein a pressure in excess of about 5 pounds per square inch on the outer surface of the foam is attained within the volume.

5. The phenolic foam produced by the method of claim 1.

6. The phenolic foam produced by the method of claim 2.

7. The phenolic foam produced by the method of claim 3.

8. The phenolic foam produced by the method of claim 4.

* * * * *